W. S. BLAKE.
Clamp for Chandelier-Tubes.

No. 218,156.        Patented Aug. 5, 1879.

Witnesses
S. N. Piper
W. W. Lunt

Inventor
William S. Blake
by attorney
R. H. Eddy

UNITED STATES PATENT OFFICE.

WILLIAM S. BLAKE, OF BOSTON, MASSACHUSETTS.

IMPROVEMENT IN CLAMPS FOR CHANDELIER-TUBES.

Specification forming part of Letters Patent No. 218,156, dated August 5, 1879; application filed June 25, 1879.

*To all whom it may concern:*

Be it known that I, WM. S. BLAKE, of Boston, of the county of Suffolk and State of Massachusetts, have invented a new and useful Improvement in Tube or Rod Clamps; and do hereby declare the same to be described in the following specification, and represented in the accompanying drawings, of which—

Figure 1:
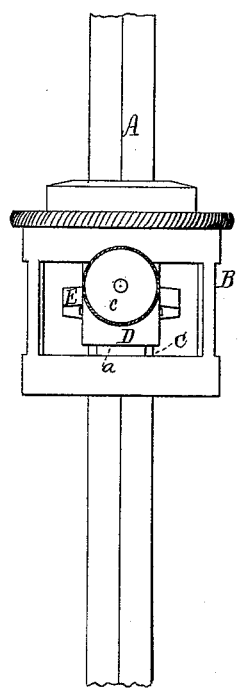
Figure 2:
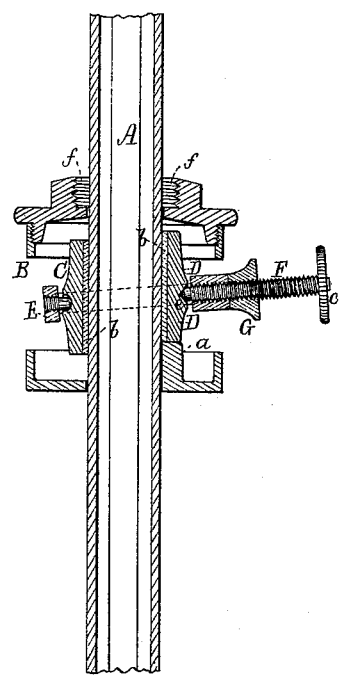
Figure 3:
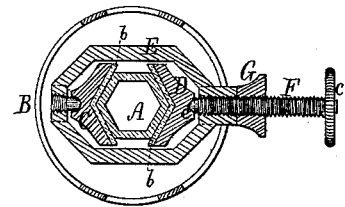

Figure 1 is a front elevation, Fig. 2 a longitudinal section, and Fig. 3 a transverse section, of a rod or tube and my invention applied to it.

My improved clamp is designed for use in chandeliers, gasaliers, or lamps, or various other articles, and is intended to support a tube or rod thereof, and its appliance or appliances, whatever such may be, at any desirable altitude within the range of its motion.

In the drawings, A is to be supposed to represent a tube or rod adapted to slide longitudinally within a case or carrier, B, furnished on its bottom with an abutment, $a$, directly over which is one of two friction brakes or jaws, C D. These brakes or jaws, arranged on opposite sides of the tube or rod, are supported in and pivoted to a yoke, E, that encompasses the rod, all being as shown.

The bearings or inner faces of the jaws may have facings $b$ $b$, of leather or other suitable yielding material, arranged on them, and with respect to the tube or rod, in manner as shown.

The pivot of one of the jaws is the conical or tapering inner end of a male screw, F, such screw being provided with a milled head, $c$, and screwed into the yoke, and also into a pivotal bearing, $e$, formed in the jaw. On the screw F is screwed a check-nut, G.

On drawing the tube or rod A lengthwise in one direction one of the jaws will be forced or drawn against the abutment, by which the movement of the said jaw with the tube will be arrested. The tube or rod by friction against the other jaw will next cause it to move, and to so move the yoke as to make both jaws bind upon or grasp the rod or tube in a manner to either estop it from sliding between them, or to cause it to do so with the degree of friction that may be required, the friction being regulated by the screw F, which, on being screwed forward in the yoke, will set the jaws nearer together, so as to increase their hold on the rod or tube. On the said tube or rod being moved the opposite way longitudinally the yoke and jaws will move so as to readily admit it (the rod or tube) to be so moved.

The case or carrier B at its top I usually provide with a female screw, $f$, arranged in it in manner as represented, such being for connecting the carrier to the frame of a chandelier, or to any other article to which it may be desirable to apply it.

Before my invention it has been customary to use, with a chandelier-rod, a lever or toggle clamp having jaws to prevent free motion upward of the chandelier, but to resist accidental downward motion of it, examples of which are shown in the United States Patents Nos. 77,019 and 143,765, such differing, however, in other respects from my clamping mechanism, which has attached to its case or carrier the abutment $a$, to operate with the friction-jaws and yoke, and, besides, it has attached to the yoke the screw F and its set-nut G.

What I claim as my invention is as follows, viz:

1. The combination of the yoke E and its two friction jaws or brakes, C D, pivoted thereto, with the case or carrier B and its abutment $a$, all being arranged and for adaptation to a tube or rod, A, substantially in manner as set forth.

2. The combination of the screw F (provided or not with a check-nut, G, arranged on it, as described) with the yoke E, the clamp jaws or brakes C D, and the sustaining-case B and its abutment $a$, arranged and for being applied to a pipe or rod, A, substantially in manner and to operate as specified.

3. The combination of the yoke E and its jaws C D and their adjusting-screw F with the carrier B and its abutment $a$, and with the pipe or rod A, all being adapted and arranged substantially in manner and to operate as and for the purpose set forth.

WILLIAM S. BLAKE.

Witnesses:
R. H. EDDY,
W. W. LUNT.